US007788237B2

(12) United States Patent
Voronov et al.

(10) Patent No.: US 7,788,237 B2
(45) Date of Patent: Aug. 31, 2010

(54) METHOD AND SYSTEM FOR TRACKING CHANGES IN A DOCUMENT

(75) Inventors: Yohay B. Voronov, Kirkland, WA (US); Raju R. Iyer, Redmond, WA (US); Timothy B. Harahan, Seattle, WA (US); Charles H. Burns, III, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 11/016,611

(22) Filed: Dec. 17, 2004

(65) Prior Publication Data

US 2006/0136510 A1    Jun. 22, 2006

(51) Int. Cl.
*G06F 7/00* (2006.01)
*G06F 17/00* (2006.01)
(52) U.S. Cl. ...................... 707/695; 715/229
(58) Field of Classification Search .............. 707/695; 715/229
See application file for complete search history.

(56) References Cited

U.S. PATENT DOCUMENTS

| 5,890,176 | A | * | 3/1999 | Kish et al. ................ 715/205 |
| 5,966,512 | A | * | 10/1999 | Bates et al. .............. 709/205 |
| 6,029,175 | A | * | 2/2000 | Chow et al. ............. 707/104.1 |
| 6,754,885 | B1 | | 6/2004 | Dardinski et al. ........... 717/113 |
| RE38,633 | E | * | 10/2004 | Srinivasan ................. 707/10 |
| 7,496,841 | B2 | * | 2/2009 | Hadfield et al. ........... 715/255 |
| 2004/0030992 | A1 | * | 2/2004 | Moisa et al. .............. 715/513 |
| 2004/0068678 | A1 | | 4/2004 | Li ............................. 714/38 |
| 2005/0108295 | A1 | * | 5/2005 | Karimisetty et al. ....... 707/200 |

FOREIGN PATENT DOCUMENTS

EP    0 932 108 A    7/1999

OTHER PUBLICATIONS

"The Undo/History feature," Retrieved from the Internet: http://web.archive.org/web/20041010143703/http://typo3.org/documentation/tips-tricks/the-undohistory-feature/>, last accessed on Mar. 21, 2006, p. I.
"Equivalent Undo Concept and Its Use," IBM Technical Disclosure Bulletin, vol. 34, No. 10B, Mar. 1, 1992, pp. 343-345.

* cited by examiner

*Primary Examiner*—Tony Mahmoudi
*Assistant Examiner*—Jacob F Bétit
(74) *Attorney, Agent, or Firm*—Merchant & Gould, P.C.

(57) ABSTRACT

A change list tracking mechanism supports features that require a record of values that have been modified in a document of a project management software application. Examples of the features supported include multiple undo, report generation, and audit logging. The change list tracking mechanism includes object containers and change lists. Each object container includes objects that are associated with properties of the document. A user who wants to be notified of specific modifications creates the change list to track modifications made to a specific object property in a particular object container. A property value identified in the change list may be modified by any user that accesses the document. The corresponding object container provides information about the modification to the change list. The user is identified and notified of the modification.

18 Claims, 5 Drawing Sheets

```
Interface IChangeList {
    STDMETHOD(ClearChanges()); // to clear all the pids for all the helems STDMETHOD(GetChangedHelems( HELEM ** prgHelem, ULONG * pcElems); // this
function will return all the pids that have been changed since the last time the ClearChanges()
has been called.

STDMETHOD(GetNewHelems(HELEM ** prgHelem, ULONG * pcElems); // returns
the new elements created since the changelist was cleared STDMETHOD(GetDeletedHelems(HELEM ** prgHelem, ULONG * pcElems);
// returns the elements that were deleted since the changelist was cleared STDMETHOD(ULONG, GetChangedPidCount(HELEM helem); // this function returns
the number of properties that has been changed for this helem STDMETHOD(GetChangedPids(BPID * rgPids, ULONG cPids);
// this returns the first cPids number of changed pids.

STDMETHOD(HasPidBeenChanged(HELEM helem, BPID pid);
// returns true if the property has been changed since the last ClearChangeListCall()
```

*Fig. 5*

METHOD AND SYSTEM FOR TRACKING CHANGES IN A DOCUMENT

BACKGROUND OF THE INVENTION

Project management software provides tools to assist in planning, scheduling, tracking, and analyzing a project. Many organizations rely on project management software to manage project workload, increase productivity, and boost work quality. Project management software provides a streamlined way to complete projects, maximize results, and keep track of workflow in one central location. Project managers benefit by effectively estimating project time and cost, and managing project budgets and deadlines.

Many project tasks are dependent on other tasks such that making modifications to one task may affect the other tasks. Modifications to a project document are saved to a file which occupies valuable memory space. Features that require a list of modifications must access the file which can be time consuming. Examples of such features include undoing modifications to a document that have been performed by many different users and regenerating a report to account for the modified data.

SUMMARY OF THE INVENTION

The present invention is directed to a method and system for tracking changes in a document associated with a project management software application. A change list tracking mechanism supports features that require a record of values that have been modified in a project document. For example, a multiple undo feature is enabled such that the system may be returned to a previous version of the project document. A reporting feature allows modifications to the project document to be automatically updated in a report without regenerating the entire report. An audit logging feature associates specific modifications to the project document with a particular user that performed the modification. The project document may be any document that is shared among different users.

The change list tracking mechanism includes object containers and change lists. Each object container includes objects that are associated with properties of the project document. A user who wants to be notified of specific changes to the document creates the change list to track modifications made to a specific object property in a particular object container. The user may be associated with the change list by a change list number.

A property value identified in the change list may be modified by any user that accesses the project document. The corresponding object container provides information about the modification to the change list. The modification information may include objects that have been modified, added, and/or deleted. The modification information may also include property identifiers of the properties that have been changed. The requesting user is identified using the change list number and notified of the modification. The change list may then be cleared, and the cycle repeats for any subsequent modifications to the document.

The modification information is processed in different ways depending on the feature to be enabled. For a multiple undo feature, the modified data from the change list is stored in an undo buffer. For a reporting feature, the modified data in the change list is used to update a report. For an audit logging feature, the log operation is performed by identifying the user that modified the data from the change list.

BRIEF DESCRIPTION OF THE DRAWINGS

FIG. 5 shows example software code of a process for tracking changes in a document of a project management software application, in accordance with the present invention.

DETAILED DESCRIPTION OF THE PREFERRED EMBODIMENT

A change list tracking mechanism supports features that require a record of values that have been modified in a document of a project management software application. For example, a multiple undo feature is enabled such that the system may be returned to a previous version of the project document. A reporting feature allows modifications to the project document to be automatically updated in a report without regenerating the entire report. An audit logging feature associates specific modifications to the project document with the particular user that performed the modification.

The change list tracking mechanism includes object containers and change lists. Each object container includes objects that are associated with properties of the project document. A requesting user who wants to be notified of specific changes to the project document creates the change list to track modifications made to a specific object property in a particular object container. A property value identified in the change list may be modified by any user that accesses the project document. The corresponding object container provides information about the modification to the change list. The requesting user is then identified and notified of the modification.

Illustrative Operating Environment

Figure 1:
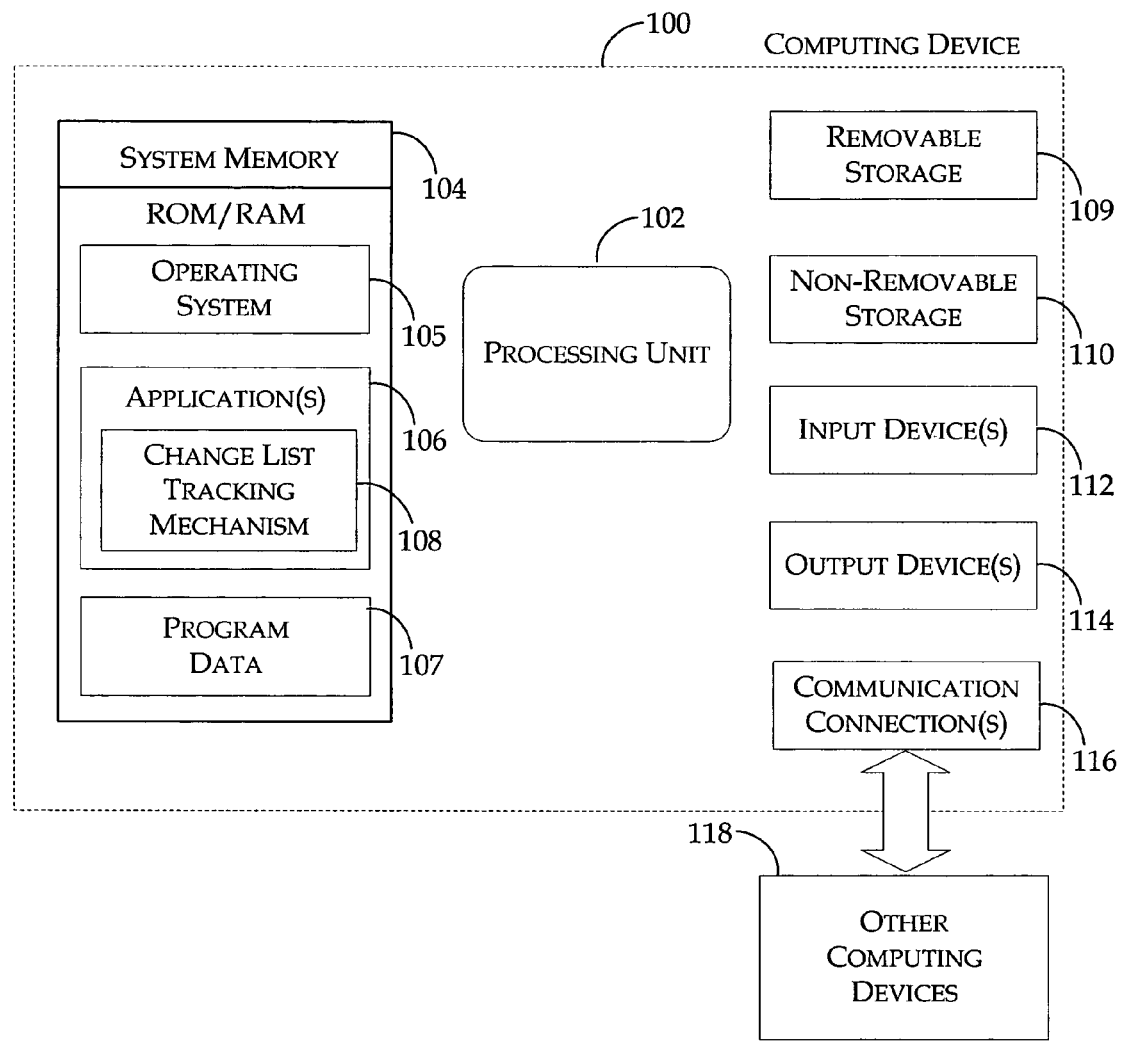
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A change list tracking mechanism 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110.

Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Tracking Changes to a Document in a Project Management Software Application

Figure 2:
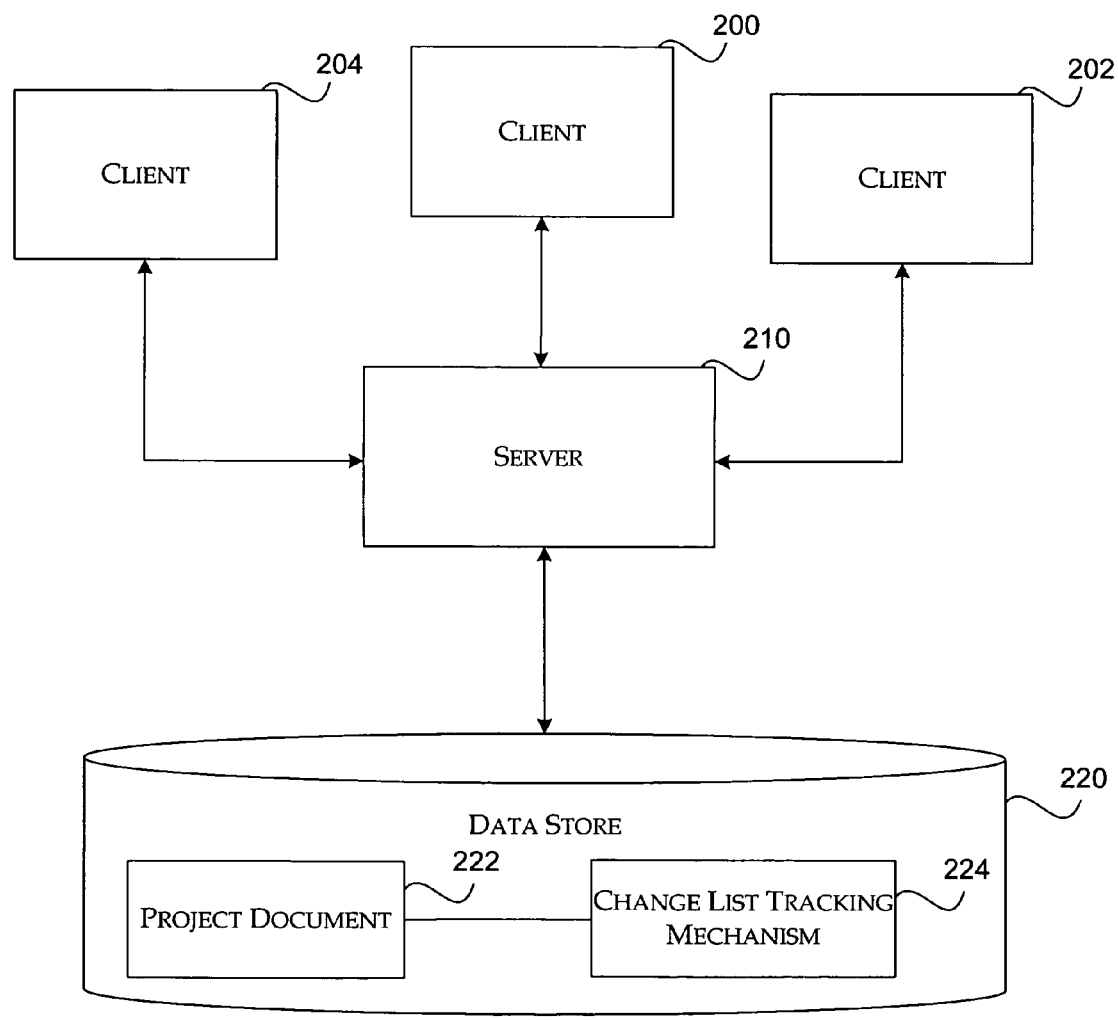
FIG. 2 illustrates a block diagram of a system for tracking changes in a document of a project management software application, in accordance with the present invention.

FIG. 2 illustrates a block diagram of a system for tracking changes to a document in a project management software application. The system includes clients 200, 202, 204, server 210, and data store 220. Clients 200, 202, 204 and data store 220 are coupled to server 210. Data store 220 includes project document 222 and change list tracking mechanism 224. Project document 222 may be any document used in a project management software application that is shared among clients 200, 202, 204. Change list tracking mechanism 224 records modifications that have been made to data in project document 222.

In one embodiment, project document 222 is a project schedule. A typical project schedule includes a combination of tasks, resources, assignments, links and calendars. A task is an operation to be performed. A resource is a person assigned to a task. An assignment maps a task to a resource. A link defines a relationship between two or more tasks. A calendar defines the working time of a resource. The project schedule may be created such that the task is completed in the shortest possible period of time.

Change list tracking mechanism 224 is arranged to support features that require a record of values that have been modified in project document 222. Change list tracking mechanism 224 also reduces the memory consumption for the feature. For example, any user at clients 200, 202, 204 may modify values in project document 222. All of the modified values are recorded in change list tracking mechanism 224. A project manager may utilize change list tracking mechanism 224 to undo all of the modified values (i.e., multiple undo feature). Change list tracking mechanism 224 also allows user to reorder a sequence of tasks in project document 222 without affecting the project schedule.

Change list tracking mechanism 224 may also support features that enable report generation and audit logging. A report may be directly linked to project management data. Changes to the data in project document 222 are automatically updated in the report without having to regenerate the entire report. The audit logging feature provides information about the user who is responsible for particular modifications to project document 222.

Figure 3:
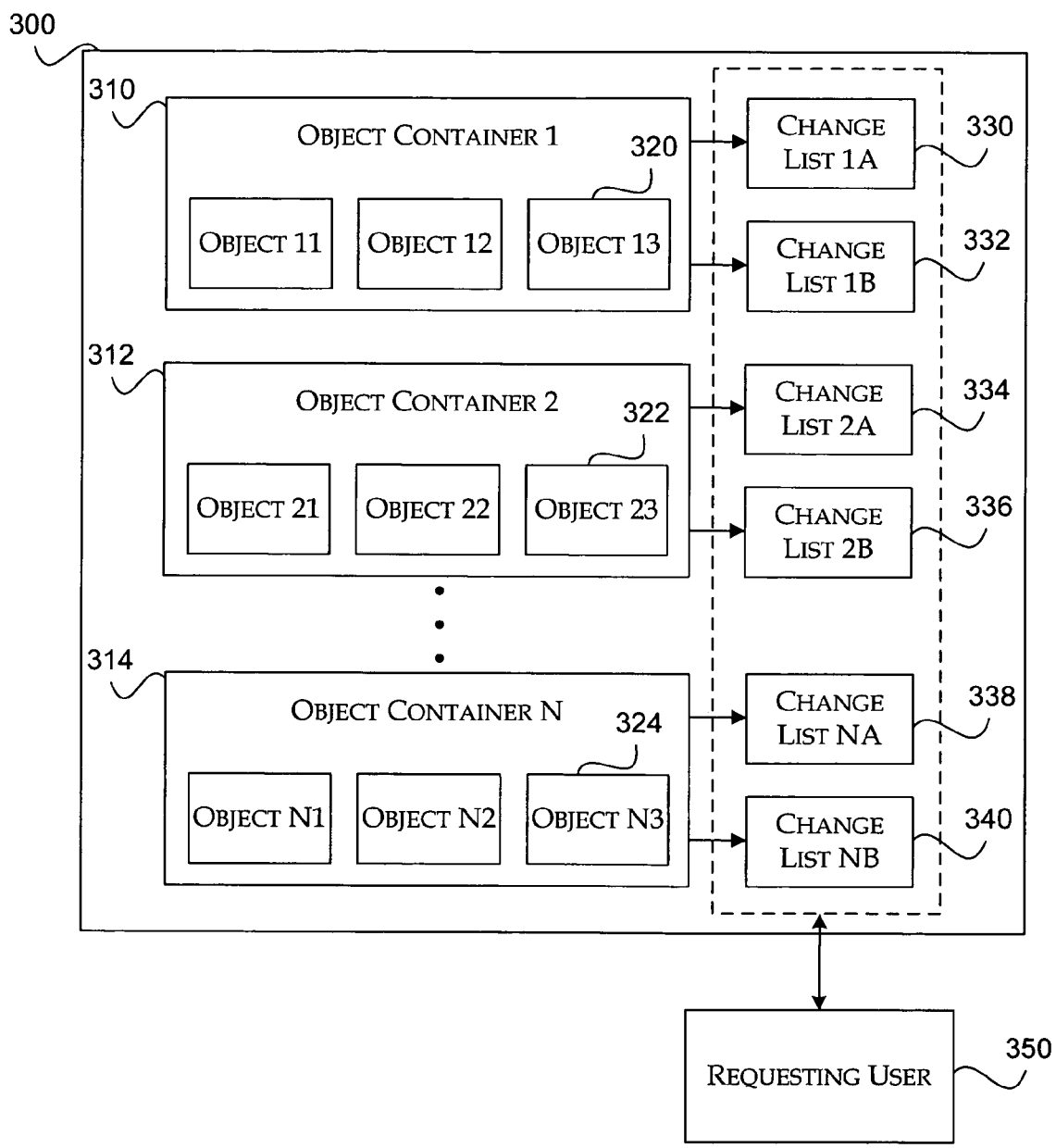
FIG. 3 illustrates a block diagram of a change list tracking mechanism, in accordance with the present invention.

FIG. 3 illustrates a block diagram of a change list tracking mechanism. Change list tracking mechanism 300 includes object containers 310, 312, 314 and change lists 330, 332, 334, 336, 338, 340. Object containers 310, 312, 314 include objects 320, 322, 324. Objects 320, 322, 324 are associated with properties of a project document in a project management software application. Examples of the associated properties include start/finish dates of a specific task, the duration of a task, a deadline date for completion of a task, and the resources assigned to a task. Different objects may be classified within different object containers. Object containers 310, 312, 314 are associated with specific change lists. For example, object container 310 is associated with change lists 330, 332.

Each change list 330-340 records modifications to objects 320, 322, 324 in the associated object container 310, 312, 314 to enable features that may be affected by the modification. For example, a multiple undo feature is enabled such that the system may be returned to a previous version of the project document. A reporting feature allows modifications to the project document to be automatically updated in a report without regenerating the entire report. An audit logging feature associates specific modifications to the project document with the user that performed the modification. Modifications may include reordering, moving, deleting, or adding tasks to a project schedule. The information in the change list is provided in a particular order to ensure that an accurate record of changes is maintained.

The change list does not necessarily record every modification made to every object in an object container. A user that wants to be notified of specific changes to a document establishes the change list to track modifications made to a specific property or properties of the objects in a particular object container. Thus, change lists 330-340 may be adapted to serve a specific purpose.

For example, requesting user 350 may establish change list 330 to track modifications made to object 11 and object 12 in object container 310. Object container 310 may correspond to all events associated with particular tasks. Object 11 may correspond to start dates associated with the particular tasks, and object 12 may correspond to completion dates associated with the particular tasks. When a value of object 11 or object 12 is modified, object container 310 provides information about the modification to change list 330. For example, a project manager may postpone the expected completion date of a task by modifying the value of the corresponding object. Object container 310 transfers information about the modified completion date to change list 330. Requesting user 350 (i.e., the user who requested to be notified of any changes to the completion date of the task) is notified of the date modification. Change list 330 may then be cleared, and the cycle repeats for any subsequent modifications to object 11 or object 12.

More than one user may request the same modification information. For example, three different users may want to be notified when the start and/or completion date of a task has been modified. Each user is assigned to the same change list by a change list number. When the change list receives information about a modification from the object container, all of the requesting users that are identified by the change list number are notified of the modification.

More than one change list may be associated with each object container to track a different property or group of properties associated with the object container. A user may establish a change list to track specific properties to enable different features that require the collection of different modification information. For example, collecting modification information to generate a project report is a different process than obtaining modification information for a multiple undo feature.

The modification information is processed in different ways depending on the feature to be enabled. For the multiple undo feature, the modified data from the change list is stored in an undo buffer. For the reporting feature, the modified data in the change list is used to update the report. For the audit logging feature, the log operation is performed by identifying the user that modified the data from the change list.

Figure 4:
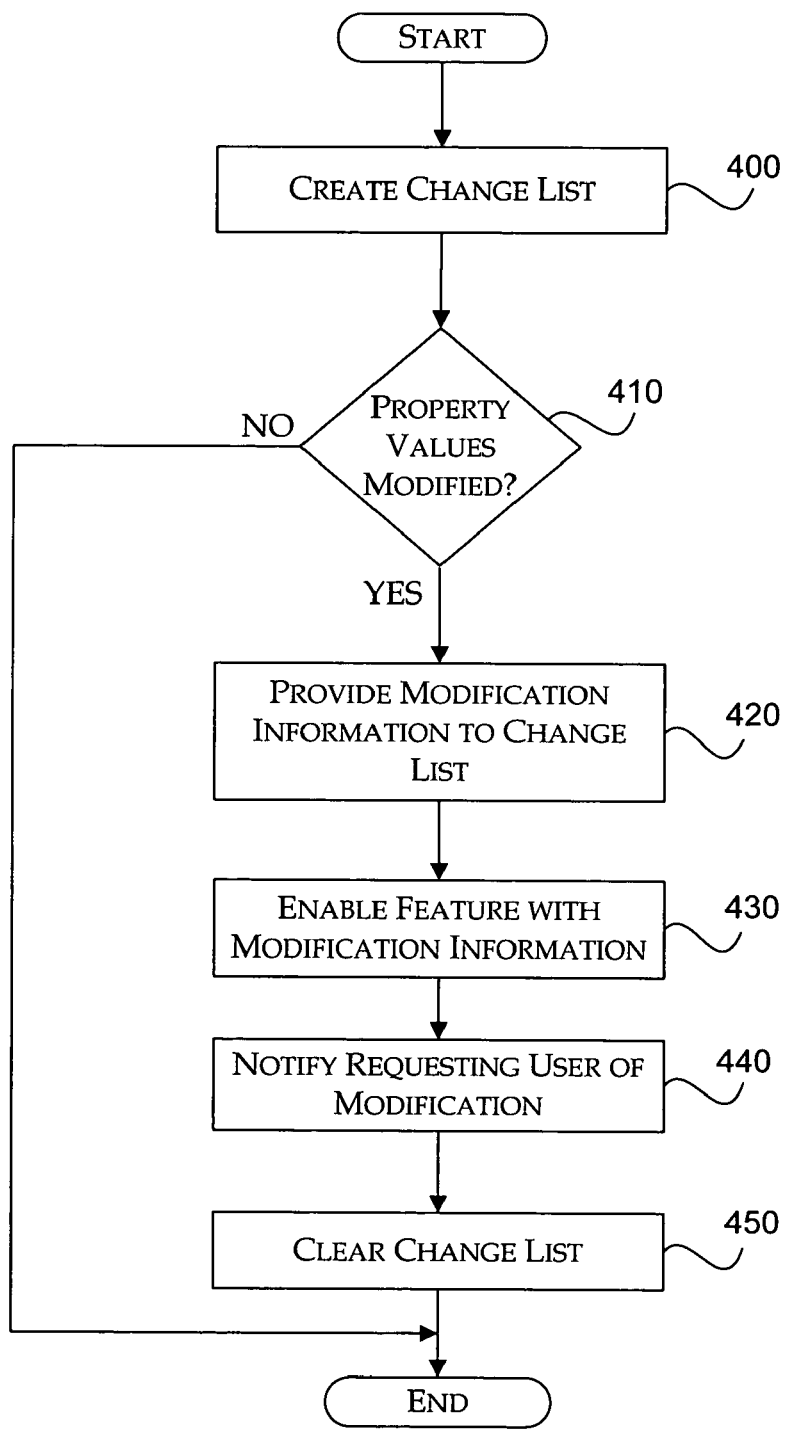
FIG. 4 illustrates an operational flow diagram illustrating a process for tracking changes in a document of a project management software application, in accordance with the present invention.

FIG. 4 illustrates an operational flow diagram illustrating a process for tracking changes in a document of a project management software application. The process begins at a start block where the document is loaded in memory of a computing device. In one embodiment, the document is a project schedule that is shared among different users.

Moving to block 400, a change list is created by a user that wants to be notified of specific modifications to the document. The user is associated with the change list by a change list number. The change list is associated with a particular object container. The change list is established to track modifications of a property or group of properties of objects in the object container. The objects are associated with elements of the document. Examples of properties to track include: start/finish dates of a specific task, the duration of a task, a deadline date for completion of a task, and the resources assigned to a task.

Proceeding to decision block 410, a determination is made whether any values of the properties identified in the change list have been modified. The modifications may be made by any of the users that access the document. The modifications may include reordering, moving, replacing, deleting, or adding information to the document. If no modifications have been made to the property values identified in the change list, processing terminates at an end block. If modifications have been made to the property values identified in the change list, processing continues at block 420.

Advancing to block 420, the object container provides the modification information to the associated change list. The modification information may include objects that have been modified, added, and/or deleted. The modification information may also include property identifiers of the properties that have been changed.

Transitioning to block 430, a feature is enabled with the modification information according to corresponding rules. For a multiple undo feature, the modified data from the change list is stored in an undo buffer. For a reporting feature, the modified data in the change list is used to update the report. For an audit logging feature, the log operation is performed by identifying the user that modified the data from the change list.

Continuing to block 440, the requesting user is notified of the modification. In one embodiment, the requesting user is identified and located using the change list number. Moving to block 450, the change list is cleared. Processing then terminates at the end block.

FIG. 5 shows example software code of a process for tracking changes to a document associated with a project management software application. A user may call an application program interface to create a change list that monitors modifications made to objects specified in a project array. If the change list creation method is successful then the user who requested the change list is provided with a pointer to an IChangeList interface 500. The requesting user is associated with a change list number that identifies the requested change list. ClearChanges( ) 510 is called to clear all of the property identifiers for all objects associated with the change list. Modifications are then made by any number of users to the property associated with the object(s) corresponding to the change list. For example, a project manager may postpone the completion date of a task.

GetChangedHelems( ) 520 returns any property identifiers that have been changed since the change list was cleared. GetNewHelems( ) 530 returns any new elements created in the document since the change list was cleared. GetDeletedHelems( ) 540 returns any elements that were deleted from the document since the change list was cleared. GetChangedPidCount( ) 550 returns the number of properties in the document that have been changed since the change list was cleared. GetChangedPids( ) 560 returns the number of changed property identifiers. HasPidBeenChanged( ) 570 returns true if the property has been changed in the document since the change list was cleared.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for tracking modifications in a project document, comprising:

creating change lists that are each arranged to track modifications to a particular property of the project document, wherein the change lists are created in response to a command from a user;

creating change list objects by associating a project management object included in the project document with a change list;

associating each of the change list objects with one of a plurality of properties of the project document that each describe a different type of attribute of the project document;

associating each of the change lists with particular object containers, wherein the object containers comprise the project management object tracked by each change list such that a change list tracks only modifications to a particular property of a project management object included within an object container;

associating each of the change lists with a group of users that includes a user to be notified when a particular property of a project management object included within a particular object container associated with a particular change list is modified;

determining when a property is modified;

providing information associated with the modified property from the object container to the change list associated with the modified property; and sending a notification to the user associated with the change list that the property has been modified.

2. The computer-implemented method of claim 1, further comprising associating each of the change lists with a group of users by a change list number.

3. The computer-implemented method of claim 1, further comprising storing the information associated with the modified project schedule task in an undo buffer to enable a multiple undo feature.

4. The computer-implemented method of claim 1, further comprising identifying a user that modified the project schedule task.

5. The computer-implemented method of claim 4, further comprising logging information related to the user to an audit log.

6. A computer system for tracking modifications in a project document, comprising:
 a processor, configured to perform actions comprising:
  creating change lists that are each arranged to track modifications to a particular property of the project document, wherein the change lists are created in response to a command from a user;
  creating change list objects by associating a project management object included in the project document with a change list;
  associating each of the change list objects with one of a plurality of properties of the project document that each describe a different type of attribute of the project document;
  associating each of the change lists with particular object containers, wherein the object containers comprise the project management object tracked by each change list such that a change list tracks only modifications to a particular property of a project management object included within an object container;
  associating each of the change lists with a group of users that includes a user to be notified when a particular property of a project management object included within a particular object container associated with a particular change list is modified;
  determining when a property is modified;
  providing information associated with the modified property from the object container to the change list associated with the modified property; and
  sending a notification to the user associated with the change list that the property has been modified.

7. The system of claim 6, wherein the property is at least one of: a start date, a finish date, a duration, a deadline date, and a resource.

8. The system of claim 6, further comprising a multiple undo feature that returns the document to a previous version that does not include the modified property.

9. The system of claim 6, further comprising updating a project management report without re-generating the entire project management report.

10. The system of claim 6, further comprising an audit logging feature that identifies a user that is associated with the modified property.

11. The system of claim 6, wherein the property is modified by performing at least one of: reordering, moving, deleting, and adding.

12. The system of claim 6, wherein the change lists are established by a user to notify the user when a property associated with a particular change list is modified.

13. The system of claim 12, wherein the change lists are cleared after the user is notified.

14. The system of claim 12, wherein the user is associated with the change lists by a change list number.

15. The system of claim 6, wherein the project document is associated with a project management software application.

16. A computer-readable storage medium having computer-executable instructions encoded thereon for tracking modifications in a project document, comprising:
 creating change lists that are each arranged to track modifications to a particular property of the project document, wherein the change lists are created in response to a command from a user;
 creating change list objects by associating a project management object included in the project document with a change list;
 associating each of the change list objects with one of a plurality of properties of the project document that each describe a different type of attribute of the project document;
 associating each of the change lists with particular object containers, wherein the object containers comprise the project management object tracked by each change list such that a change list tracks only modifications to a particular property of a project management object included within an object container;
 associating each of the change lists with a group of users that includes a user to be notified when a particular property of a project management object included within a particular object container associated with a particular change list is modified;
 determining when a property is modified;
 providing information associated with the modified property from the object container to the change list associated with the modified property; and
 sending a notification to the user associated with the change list that the property has been modified.

17. The computer-readable medium of claim 16, further comprising enabling a feature based on the information associated with the modified property.

18. The computer-readable medium of claim 17, wherein the feature is at least one of: a multiple undo feature, a report generation feature, and an audit logging feature.

* * * * *